United States Patent

Tavernier

Patent Number: 5,263,114
Date of Patent: Nov. 16, 1993

[54] CEILING ELEMENT FOR REGULATING TEMPERATURE

[75] Inventor: Bernard Tavernier, Saint-Cyr Au Mont D'OR, France

[73] Assignee: Sertim Teval, Fontaines sur Saone

[21] Appl. No.: 789,941

[22] Filed: Nov. 12, 1991

[30] Foreign Application Priority Data

Nov. 13, 1990 [FR] France ................ 90 14674

[51] Int. Cl.⁵ .......................... E04C 1/39; E04B 9/02; H05B 3/20
[52] U.S. Cl. ...................................... 392/437; 219/543
[58] Field of Search ............... 392/435, 436, 437, 438, 392/439; 219/543, 526, 213; 165/53, 49, 56, 47, 135

[56] References Cited

U.S. PATENT DOCUMENTS

| | | | |
|---|---|---|---|
| 2,608,634 | 8/1952 | Abbott | 392/435 |
| 3,057,989 | 10/1962 | Needham | 219/213 |
| 3,143,637 | 8/1964 | Rifenbergh | 165/49 |
| 3,727,538 | 4/1973 | Jacobson | 165/53 |
| 3,767,895 | 10/1973 | Needham | 165/49 |
| 3,916,151 | 10/1975 | Reix | 165/49 |
| 3,948,314 | 4/1976 | Creswick | 165/53 |
| 4,107,512 | 8/1978 | Brandenburg | 165/53 |
| 4,205,719 | 6/1980 | Norell | 165/49 |

FOREIGN PATENT DOCUMENTS

| | | |
|---|---|---|
| 1963889 | 6/1971 | Fed. Rep. of Germany. |
| 2138667 | 2/1973 | Fed. Rep. of Germany. |
| 3238970 | 4/1984 | Fed. Rep. of Germany. |

Primary Examiner—Bruce A. Reynolds
Assistant Examiner—John A. Jeffery
Attorney, Agent, or Firm—Oliff & Berridge

[57] ABSTRACT

A temperature regulating ceiling element box has a lower face, possibly covered with a decorative panel, located on the side of a room to be equipped. Its upper face is covered with at least one layer of heat-insulating material. At least some of the side walls have openings for connection to an air circulation system at a controlled temperature. The box is also equipped with a heater. The invention is useful in decoration and temperature control of a room.

11 Claims, 2 Drawing Sheets

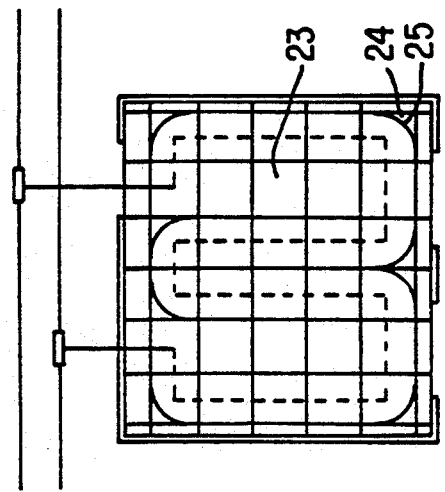
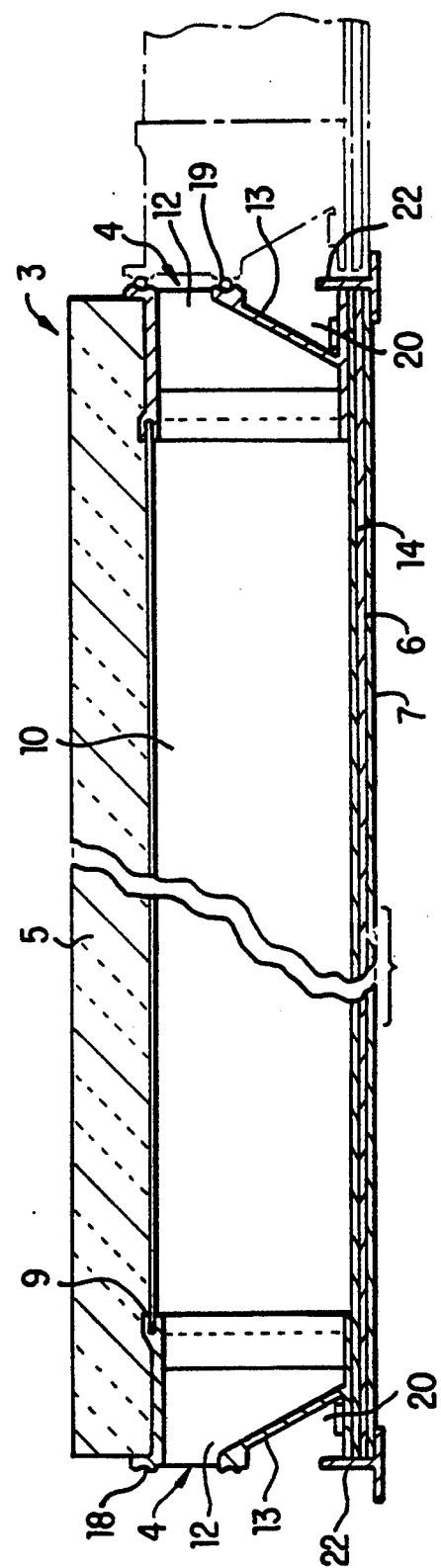

CEILING ELEMENT FOR REGULATING TEMPERATURE

TECHNICAL FIELD

The present invention relates to a ceiling element having means for regulating the temperature of the area it equips.

BACKGROUND

It is known that an area may be heated by radiation from ceiling elements. For this purpose, the ceiling elements are equipped with a heating film, covered on the room side with a decorative element or panel, and on their other face by a layer of insulating material such as glass wool.

This type of heating is very useful because of the comfort it affords. In fact, the ceiling elements play the role of heat transmitters, the calories being transmitted by radiation to cold bodies such as furniture located in the area to be heated. The result is a heating method that is very comfortable for the users, as well as an increase in available volume and enhanced appearance of the area due to the elimination of the radiators or convectors used with traditional heating methods.

It is also known that areas may be cooled in the warmer months, whether for reasons of occupant comfort or for reasons imposed by the operating conditions of certain equipment items such as computer systems.

At present, cooling is provided by pulsed cold air. This solution presents the disadvantage of some user discomfort because of the noise emitted by the pulsing air, and discomfort for users situated near the air outlets because of the draft generated in their vicinity.

SUMMARY OF THE INVENTION

An object of the invention is to furnish a ceiling element which, in the winter months, provides radiative heating of the area it equips by behaving like a heat transmitter, and which, in the hot months, allows this same area to be cooled by behaving like a heat absorber.

For this purpose, the ceiling element according to the invention comprises a box whose lower face, possibly covered with a decorative panel, faces the area to be equipped, and whose upper face is covered with at least one layer of heat-insulating material, at least some of the side walls of the box having openings for connection to a controlled-temperature air circulation system, said box also being equipped with heating means.

According to one characteristic of the invention, the air circulation system is equipped with a cooling source.

According to one advantageous embodiment of the invention, the air circulation system is also equipped with a heating source.

Advantageously, the heating means of the box is composed of an electric heating film associated with the wall of the box facing the area to be equipped.

Advantageously, the heating film is located on the outer face of this wall of the box and is covered with a decorative panel.

In practice, in the winter months, the box heating means operates such that the ceiling element behaves like a heat transmitter, allowing radiation heating. In the summer months, on the other hand, when the area is to be cooled, the heating means is out of action and the box is traversed by a cold air stream, and the ceiling element then behaves like a heat absorber.

In the heating season, since the air contained in each box is static, it participates in thermal insulation of this box.

Winter heating can also be provided by hot air circulation, allowing the flexibility of dual-energy heating if the ceiling element is also equipped with a heating film.

According to one embodiment, this ceiling element comprises a box with a generally parallelepipedic shape, in two opposite sides of which are two elongate openings, one an air inlet and one an air outlet, one of these openings being surrounded by an air tight seal around the periphery of the matching opening of a neighboring box.

Thus it is possible simply and quickly to assemble the ceiling elements while benefiting from an excellent seal of the air passage from one box to the neighboring box.

Advantageously, each box has two parts corresponding to two of its end walls. Each of these parts has a lengthwise opening for passage of air. One face of each of these parts may be provided with a generally U-shaped slot serving to fit to one end, also U-shaped, of a panel forming the upper wall and the side walls of the box. The other face of each of these parts may be provided, on the periphery of the lengthwise opening, with a groove, the groove of one part of the box being equipped with a seal while the groove of the other part of the box remains free. The lower surfaces of both parts may serve to attach a lower wall.

Thus, a box may be made from two identical end parts and two panels, made of sheet metal for example, with simple shapes.

In addition, each end part preferably has an outer face having an upper part perpendicular to the plane of lower face of the box, in which the air passage opening is provided, and a lower part inclined downward and from the outside to the inside of the box. When two boxes are placed end to end, a triangular space is obtained to accommodate part of the box support fittings.

In the case of an angled box, i.e. one designed to deflect the air stream by 90° the box has two parts for attachment to two neighboring boxes on two of its faces 90° apart. The inside of the box is preferably equipped, over its entire height, with a baffle forming an arc of a circle centered on the angle of the box common to both parts.

BRIEF DESCRIPTION OF THE DRAWINGS

The attached schematic diagrams represent, as a non-limiting example, one embodiment of a ceiling element of the invention.

FIG. 3 is a lengthwise section on an enlarged scale of the element of FIG. 2;

FIG. 4 is a highly schematic view of an installation in a room of elements according to the invention.

DETAILED DESCRIPTION OF PREFERRED EMBODIMENTS

Figure 1:
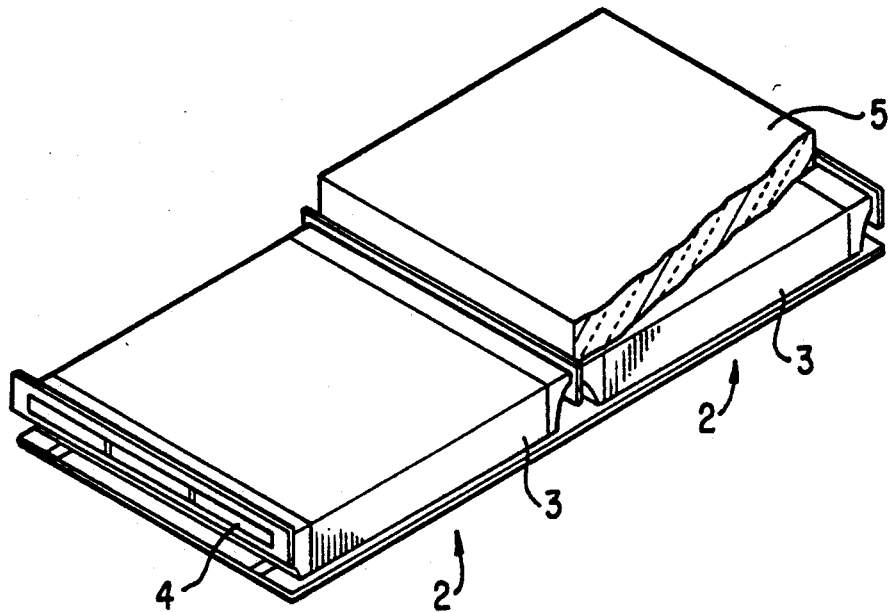
FIG. 1 is a perspective view of two juxtaposed elements in the assembled position, with the insulating material of one of the two elements having been removed for clarity of the drawing, and the insulating material of the other element being partially cut away.

Element 2 according to the invention, as shown in FIGS. 1 to 4, has a box 3 with a parallelepipedic shape having, in two of its walls, openings 4 designed to let air in and out, whose upper face serves to support a layer 5 of heat-insulating material such as a mineral wool, and whose lower face serves to support a heating film 6, which may be covered with a decorative panel 7.

Figure 2:
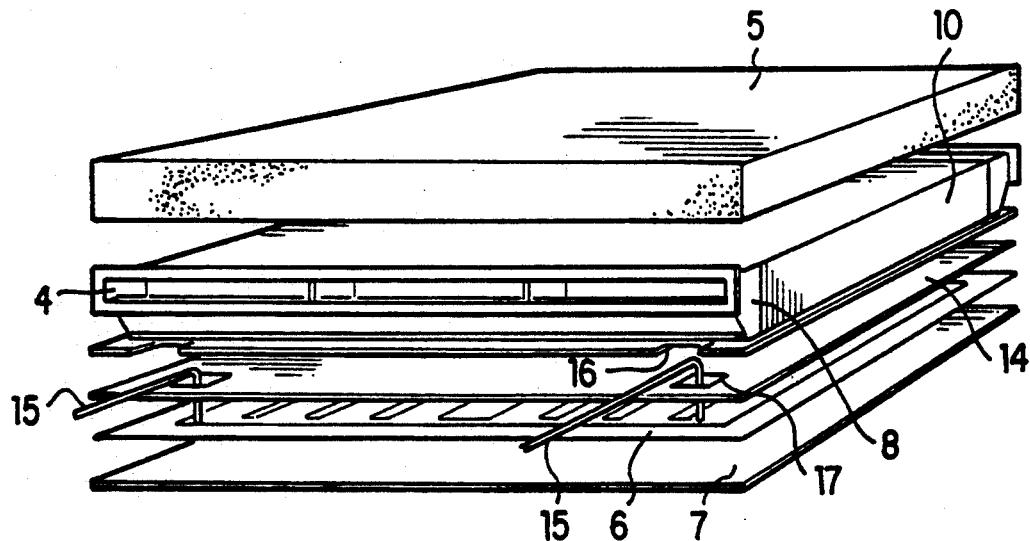
FIG. 2 is an exploded perspective view of one element according to the invention.

FIGS. 2 and 3 show an element according to the invention in greater detail.

The element shown in the drawings has two parts 8 made of synthetic material forming two end walls, each of which has a lengthwise opening 4 for passage of air. In its face turned toward the inside of the box, each end part 8 has a slot 9 serving to fit to one end of a sheet-metal panel 10 folded in a U shape constituting the upper wall and the side walls of the box, whereby the free edges of the side walls each have a return to the outside parallel to the upper wall. Each part 8 has, on its outwardly turned face, an upper part 12 perpendicular to the plane of the lower face of the box in which is provided an opening 4 for passage of air, and a lower part 13 inclined downward and from the outside to the inside of the box. The lower part of the box is closed by a panel 14, made of sheet metal for example, attached by gluing to the lower faces of the two parts 8, as well as the side returns of wall 10. On the lower face of panel 14 is attached heating film 6, as well as a possible decorative panel 7. As shown particularly in FIG. 2, recesses 16 may be provided in each end part 8 and openings 17 in lower wall 14 for passage of wires 15 supplying heating film 6.

In the edge delimiting each opening 4, designed for air passage, a peripheral groove 18 may be provided. Groove 18 associated with one of the parts is equipped with a seal 19, while the groove associated with the other part remains free. Hence, when the two elements are placed end to end, seal 19 associated with one of the parts engages in groove 18 of the adjacent element, which immediately affords a perfect seal.

As can also be seen from the drawing, when two neighboring boxes are in the assembled position, a space 20 is provided in the lower assembly zone of two elements, which, on the one hand, allows electric wires 15 to pass and on the other hand accommodates part of the fittings 22 for hanging the ceiling elements from the ceiling.

FIG. 4 shows one example of a layout of elements according to the invention in a room, the elements according to the invention being disposed two by two side by side and in communication, with provision of a number of elements 23 which are purely decorative.

As can be seen from FIG. 4, some boxes 24 have particular shapes so that they deflect the air stream by 90°. These boxes 24 have two connecting parts disposed on two faces that are 90° from each other, and the inside of the box is equipped, throughout its height, with a baffle 25 forming an arc of a circle centered on the angle of the box as an end part 8.

The invention furnishes a great improvement to existing technology by providing a ceiling element which can behave as a heat transmitter in the heating season, and as a calorie absorber when it is desirable to cool the room.

It goes without saying that the invention is not confined to the single embodiment of this ceiling element described above as an example; on the contrary it covers all alternative embodiments. Thus, for example, each box may not have a decorative panel, or the assembly means of two ceiling elements can be different, without thereby departing from the scope and spirit of the invention.

I claim:

1. A ceiling element for regulating the temperature of an area, comprising: a heater, a box of generally parallelepipedic shape having a lower face which faces an area, an upper face which is covered with at least one layer of heat-insulating material, side walls, at least two of the side walls having openings for air to enter and leave said box and for fluid communication with an air circulation system at a controlled temperature, at least one said elongated opening being surrounded by a seal configured to provide a seal with a periphery of a matching opening of a neighboring box.

2. A ceiling element according to claim 1, wherein said heater is comprised of an electric heating film associated with said lower face.

3. A ceiling element according to claim 2, wherein said heating film is located on an outer side of said lower face and is covered with a decorative panel.

4. A ceiling element according to claim 1, wherein said elongate openings are provided at opposite said side walls.

5. A ceiling element according to claim 1, wherein an exposed surface of said lower face is covered with a decorative panel.

6. A ceiling element according to claim 1, wherein said box further comprises at least two end parts corresponding to said at least two of the side walls, each said end part having a lengthwise opening for passage of air, a first face of each said end part being provided with a slot with a generally U shape serving to fit one end, also U-shaped, of a panel forming said upper face and two said side walls of the box, and a second face of each said end part being provided, on the periphery of the lengthwise opening, with an annular groove, the groove of one said end part being equipped with a seal while the groove of the other said end part remains free, the lower faces of the two parts being connectable to said lower face.

7. A ceiling element according to claim 6, wherein said second face of each said end part has an upper part perpendicular to a plane of the lower face of the box, provided with an air passage opening, and a lower part inclined downward and from the outside to the inside of the box.

8. A ceiling element according to claim 6, wherein said end parts are on side walls that are at an angle of 90° from one another, and the inside of the box is equipped, throughout its height, with a baffle forming an arc of a circle centered on the angle of the box common to both parts.

9. A temperature control system comprising an air circulation system in fluid communication with a ceiling element for regulating the temperature of an area; comprising:

the ceiling element having a heater, a box of generally parallelepipedic shape having a lower face which faces said area, an upper face which is covered with at least one layer of heat-insulating material, side walls, at least two of the side walls having elongate openings for air to enter and leave said box and for fluid communication with said air circulation system at a controlled temperature, at least one said elongate opening being surrounded by a seal configuration to provide a seal with a periphery of a matching opening of a neighboring box.

10. A system according to claim 9, wherein the air circulation system is equipped with a cooling source.

11. A system according to claim 10, wherein the air circulation system is also equipped with a heating source.

* * * * *